April 29, 1969     C. L. BUSHNELL ET AL     3,441,442
FUEL CELL WITH CONTAINMENT FOR ELECTROLYTE EXPANSION
Filed July 13, 1966
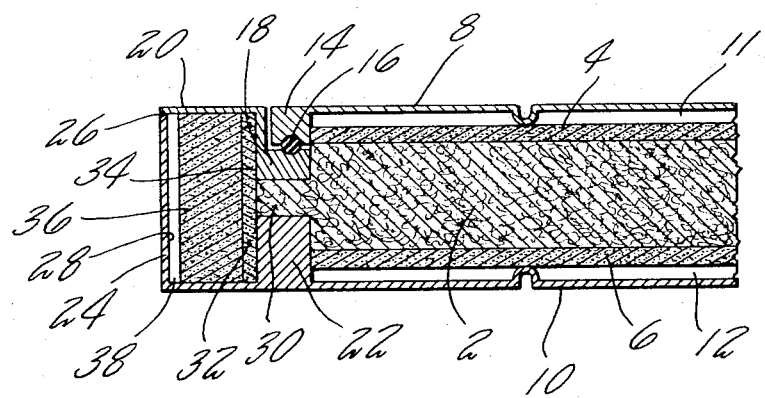
INVENTORS
CALVIN L. BUSHNELL
HOWARD J. LATIMER, JR.
BY Charles A Warren
ATTORNEY 3,441,442
FUEL CELL WITH CONTAINMENT FOR
ELECTROLYTE EXPANSION
Calvin L. Bushnell, South Glastonbury, and Howard J. Latimer, Jr., Vernon, Conn., assignors to United Aircraft Corporation, East Hartford, Conn., a corporation of Delaware
Filed July 13, 1966, Ser. No. 564,894
Int. Cl. H01m 27/02
U.S. Cl. 136—86                                4 Claims This invention relates to a trapped-electrolyte fuel cell assembly with a provision for expansion of the electrolyte during cell operation.

In this type of fuel cell where the electrolyte is contained within the space between duel electrodes and is sealed therein, the temperature differential between the non-operating temperature of the fuel cell and the operating tempertaure is such that a substantial thermal expansion of the electrolyte takes place. Furthermore, changes in electrolyte volume occur as a consequence of changes in the water content brought about by power level changes within the fuel cell. Either provision must be made for the electrodes to move about to accommodate this expansion or a space must be provided into which the electrolyte may expand. In the absence of the specific arrangement for the electrolyte expansion, the electrodes are frequently caused to bulge with result of damage to the structure of the electrode.

Accordingly, a feature of the present invention is an arrangement for accommodating the electrolyte expansion which does not require a relative movement between the electrodes and which will not cause an undesirable increase in pressure within the fuel cell. More specifically, a feature of the invention is an expansion chamber communicating with the electrode space and arranged to receive the excess of electrolyte as the fuel cell is heated to operating condition. Another feature of the invention is the use of a porous material within a part of the chamber into which the electrolyte expands together with a pressurized gas space in the chamber to permit the electrolyte to flow into the porous material.

Other objects and advantages of the present invention will be apparent from the following detailed specification and claims and from the accompanying drawing.

The single figure is a sectional view through a part of a fuel cell.

The invention is shown in a fuel cell having a fibrous matrix 2 which spaces apart the electrodes 4 and 6. The matrix receives the electrolyte in the pores thereof and in this type of cell the space between the electrodes is filled with the electrolytes so there are no gas pockets therein. The electrodes are generally a porous sintered material, the pores of which are dimensioned to maintain an electrolyte-gas interface between the opposite surfaces of the electrode.

In the preferred construction each electrode has a coarse pore layer and a fine pore layer, the latter being adjacent to the electrolyte space. An effective pore size for this type of electrode is a coarse pore from 6 to 12 microns and a fine pore of from 1.5 to 4 microns.

The electrodes are backed up by cover plates 8 and 10, respectively. These cover plates are formed in conjunction with the respective electrode compartments 11 and 12 to which fuel and an oxidant are supplied. The fuel and oxidant may be any of the well-known fuel or oxidants, one example being hydrogen as the fuel and oxygen as the oxidant with the electrolyte being an hydroxide such as potassium hydroxide. This type of cell where the electrodes 4 and 6 are porous for the flow of the gaseous hydrogen and oxygen partially therethrough to form the electrolyte-gas interface is frequently referred to as the "Bacon-type" cell. Obviously, the invention is not specifically applicable to this type of cell and has more general utility.

The periphery of the cover plate 8 has an inwardly projecting flange 14 which presses against a seal 16, the latter engaging an inwardly projecting flange 18 on a ring-shaped cap 20. The cover plate 10 has an inwardly projecting flange 22 in alignment with the flange 14. This plate 10 extends beyond the flange 22 to have a larger peripheral flange 24 extending substantially the thickness of the fuel cell and engaging with and welded as at 26 to the periphery of the cap 20. The outer portion of the plate 10, the cap 20 and the peripheral flange 24 form the walls of an expansion chamber 28 which, as will be apparent, surrounds the fuel cell assembly. This chamber communicates with the electrolyte space in which the matrix 2 is located through an annular passageway 30 located between the end of the flange 22 and the rib 18 of the cap 20.

Located within the chamber 28 is a ring 32 of porous material in the form of a cylinder engaging the outer periphery of the flange 22 and the corresponding surface 34 on the cap 20. This is preferably a fine-pore material, the porosity and mean pore size of which is substantially the same as the porosity and the mean pore size of the fine pore layer of the electrode. Surrounding the ring 32 is a cooperating and thicker ring 36 of coarse porous material, the porosity and mean pore size of which is approximately between one and one half and two times the porosity and mean pore size of the coarse pore of the electrodes. Thus, for example, the ring 32 may have a pore size of from 1.5 to 4 microns and the ring 36 may have a pore size of from 12 to 20 microns.

This porosity will insure electrolye absorption without affecting the optimum electrolyte-reactant gas interface within the working electrodes. The ring 36 fills a substantial part of the chamber 28 leaving gas volume 38 at its periphery to which a gas under pressure is supplied, this pressure being close to the pressure of the fuel and the oxidant in the chambers 11 and 12.

It will be understood that several fuel cells of this type are arranged in stacked relation one on top of another and the stack or module is then clamped thereby applying a pressure to each of the electrodes 8 and holding the flange 14 on the periphery against the seal 16 thereby preventing any leakage of electrolyte at this point. Further, it will be understood that the electrodes 4 of each cell are effectively insulated from the cooperating electrode 6 by the seal 16 so that the electrodes of the several cells may be suitably connected to provide the desired voltage from the assembly.

In operation, the gas under pressure in the space 38, when the cell is not in operation, forces the electrolyte out of the porous ring 36 and into the matrix between the electrodes. When the cell is placed in operation, the increase in temperature of the electrolyte causes expansion so that the excess electrolyte expands out through the passage 30 and the fine pore ring 32 into the coarse pore 36. This latter will absorb the excess electrolyte and is made of such a dimension that it will be more than large enough to accommodate the amount of excess electrolyte at the operating temperature of the cell. With this arrangement, it is obvious that expansion occurs without any substantial variation of the pressure within the cell and, therefore, the electrodes are not subjected to abnormal stresses and there is no necessity for the electrodes to move apart within the module in which the several cells are positioned.

It is to be understood that the invention is not limited to the specific embodiment herein illustrated and described but may be used in other ways without departure from its spirit as defined by the following claims.

We claim:

1. In a fuel cell system, a fuel cell including spaced opposed electrodes each including an impervious outer wall and an inner porous wall spaced from the first wall and pervious to gas positioned in the chamber between the walls, the outer walls of the opposed electrodes forming the opposite walls of a container for the cell, sealing means between said electrodes adjacent peripheries thereof to define the peripheral wall of the container, an electrolyte substantially filling the space between the electrodes and retained therein by the sealing means, the latter maintaining a substantially fixed spacing between the electrodes, at least one passage through the peripheral wall of the container and a chamber external to the cell and communicating with the electrolyte space through said passage, said chamber having a porous material therein filling a substantial part of the chamber, the latter having also a gas space therein with the porous material positioned between the gas space and passage, said porous material receiving overflow electrolyte as the cell heats up during operation.

2. A fuel cell system as in claim 1 in which the inner porous wall of each electrode is a porous sinter and the porous material in the chamber is a similar sintered material with a larger porosity.

3. A fuel cell system as in claim 1 in which the porous material in the chamber has a greater porosity than that of the electrodes except for a portion directly adjacent to the passage, this portion having a porosity substantially the same as that of the electrode.

4. In a fuel cell system, a fuel cell including spaced opposed electrodes each including a porous wall, said electrodes being spaced apart to define an electrolyte space, a matrix within said space, an electrolyte substantially filling the porosity of the matrix within said space, cover plates for said electrodes having means thereon to define a peripheral wall for the cell, an annular chamber surrounding the cell and having its inner surface defined by the peripheral wall of the cell, said peripheral wall having at least one passage therein communicating between the electrolyte space and said chamber, the latter having a substantial part thereof filled by a ring of porous material engaging with the peripheral wall of the cell, the remainder of said chamber defining a gas space by which to apply pressure to the porous ring.

References Cited

UNITED STATES PATENTS

| | | | |
|---|---|---|---|
| 3,143,440 | 8/1964 | Hunger et al. | 136—86 |
| 3,300,343 | 1/1967 | Huber et al. | 136—86 |

ALLEN B. CURTIS, *Primary Examiner.*